United States Patent [19]

Forsberg

[11] 4,329,249

[45] May 11, 1982

[54] CARBOXYLIC ACID DERIVATIVES OF ALKANOL TERTIARY MONOAMINES AND LUBRICANTS OR FUNCTIONAL FLUIDS CONTAINING THE SAME

[75] Inventor: John W. Forsberg, Mentor-on-the-Lake, Ohio

[73] Assignee: The Lubrizol Corporation, Wickliffe, Ohio

[21] Appl. No.: 946,294

[22] Filed: Sep. 27, 1978

[51] Int. Cl.³ .................... C10M 1/32; C07C 69/593
[52] U.S. Cl. ..................... 252/34.7; 252/34; 252/49.3; 252/51.5 A; 560/196
[58] Field of Search ............... 560/196; 252/34, 49.3, 252/34.7, 51.5 A

[56] References Cited

U.S. PATENT DOCUMENTS

| | | | |
|---|---|---|---|
| Re. 27,582 | 2/1973 | Kahn et al. | 560/196 |
| 2,588,412 | 3/1952 | Rocchini | 252/51.5 |
| 2,858,329 | 10/1958 | Braaten et al. | 560/196 |
| 3,216,936 | 11/1965 | Le Suer | 252/32.7 |
| 3,219,666 | 11/1965 | Norman et al. | 560/196 |
| 3,252,908 | 5/1966 | Coleman | 252/31 |
| 3,255,108 | 6/1966 | Wiese | 252/32.7 |
| 3,269,946 | 8/1966 | Wiese | 252/32.5 |
| 3,311,558 | 3/1967 | Prizer et al. | 544/71 |
| 3,311,561 | 3/1967 | Anderson et al. | 252/75 |
| 3,364,001 | 1/1968 | Drummond et al. | 44/71 |
| 3,378,494 | 4/1968 | Berger | 252/77 |
| 3,502,677 | 3/1970 | Le Suer | 260/268 |
| 3,629,119 | 12/1971 | Weaver | 252/77 |
| 3,658,707 | 4/1972 | Delafield et al. | 252/51.5 A |
| 3,687,644 | 8/1972 | Delafield et al. | 44/56 |
| 3,708,522 | 1/1973 | Le Suer | 560/196 |
| 3,839,419 | 10/1974 | Samour et al. | 560/196 |
| 3,920,731 | 11/1975 | Naik | 560/196 |
| 4,185,485 | 1/1980 | Schick et al. | 252/51.5 A |
| 4,225,447 | 9/1980 | Law et al. | 252/51.5 A |
| 4,230,588 | 10/1980 | Bonazza et al. | 252/51.5 A |
| 4,253,974 | 3/1981 | Valcho et al. | 252/8.55 D |
| 4,253,975 | 3/1981 | Law et al. | 252/32.7 E |
| 4,257,902 | 3/1981 | Singer | 252/18 |

FOREIGN PATENT DOCUMENTS 984409 2/1965 United Kingdom.
1532836 11/1978 United Kingdom.

*Primary Examiner*—Natalie Trousof
*Assistant Examiner*—Vera C. Clarke
*Attorney, Agent, or Firm*—Ronald Lyons; John P. Ward; William H. Pittman

[57] ABSTRACT

Nitrogen-containing phosphorus-free carboxylic acid derivatives made by reaction of an acylating agent with an alkanol tertiary monoamine are described. Typically the carboxylic acylating agent is an alkyl or alkenyl succinic anhydride containing about 20 to about 500 carbon atoms in the alkyl or alkenyl group. A typical amine is diethyl ethanol amine. These derivatives are useful in incorporating oil-soluble, water-insoluble functional additives, such as metal salts of acid phosphate and thiophosphate hydrocarbyl esters, into water-based functional fluids such as water-based hydraulic fluids.

16 Claims, No Drawings

CARBOXYLIC ACID DERIVATIVES OF ALKANOL TERTIARY MONOAMINES AND LUBRICANTS OR FUNCTIONAL FLUIDS CONTAINING THE SAME

FIELD OF THE INVENTION

This invention relates to nitrogen-containing, phosphorus-free carboxylic acid derivatives. More particularly, it relates to derivatives made from acylating agents having hydrocarbyl substituents of about 20 to about 500 carbon atoms and certain alkanol tertiary monoamines.

PRIOR ART

Carboxylic acid derivatives made from high molecular weight carboxylic acid acylating agents and amino compounds and their use in oil-based lubricants are well known. See, for example, U.S. Pat. Nos. 3,216,936; 3,219,666; 3,502,677; and 3,708,522.

Certain alkyl succinic acid/alkanol amine condensates have also been described; see, for example, U.S. Pat. No. 3,269,946. Water-in-oil emulsions containing alkyl and alkenyl succinic acid derivatives are also known; see, for example, U.S. Pat. Nos. 3,255,108 and 3,252,908.

Oil-soluble, water-insoluble functional additives are also well known. See, for example, the treatises by C. B. Smalheer and R. Kennedy Smith, published by Lezius-Hiles Co., Cleveland, Ohio, 1967, and by M. W. Ranney, published by Noyes Data Corp., Parkridge, N.J. 1973 both entitled "Lubricant Additives". In this connection, and throughout the specification and the following claims, a water-insoluble functional additive is one which is not soluble in water above a level of about 1 gram per 100 milliliters of water at 25° C. and is soluble in mineral oil at a level above 1 gram per liter.

BACKGROUND OF THE INVENTION

The reaction of a carboxylic acid acylating agent, particularly a polycarboxylic agent such as a succinic acid acylating agent with a poly-functional compound such as alkanol tertiary monoamine can produce complex products. For example, diesters, disalts, and ester/salts could be produced. Such products could involve reactions of one or or more acylating agents and/or one or more alkanol amine molecules. Furthermore, the polarity of such products and their interaction with hydrophilic and/or lipophilic systems such as oil and water systems appears to be complex.

It is an object of this invention to produce nitrogen-containing, phosphorus-free carboxylic acid derivatives of certain alkanol tertiary monoamines. Other objects and advantages of the invention will be apparent upon the study of the following specification and claims.

BRIEF DESCRIPTION OF THE INVENTION

This invention comprises a nitrogen-containing, phosphorus-free carboxylic acid derivative made by reaction of (A) at least one carboxylic acid acylating agent with (B) at least one alkanol tertiary amine, said acylating agent having at least one hydrocarbyl-based substituent of about 20 to about 500 carbon atoms and said alkanol amine (B) having one hydroxyl group and a total of up to about 40 carbon atoms.

DETAILED DESCRIPTION OF THE INVENTION

The carboxylic acid acylating agent, (A)

The acylating agents used in making the derivatives of the present invention are well known to those of skill in the art and have been found to be useful as additives for lubricants and fuels and as intermediates for preparing the same. See, for example, the following U.S. Pat. Nos. which are hereby incorporated by reference for their disclosures relating to the preparation of carboxylic acid acylating agents: 3,219,666; 3,272,746; 3,381,022; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Typically, these acylating agents are polycarboxylic acylating agents such as the succinic acid acylating agents derived from maleic acid, its isomers, anhydride and chloro and bromo derivatives.

These acylating agents have at least one hydrocarbyl-based substituent of about 20 to about 500 carbon atoms. Generally, this substituent has an average of at least about 30, and often at least about 50 carbon atoms. Typically, this substituent has a maximum average of about 300, and often about 200 carbon atoms. As used herein, the term "hydrocarbon-based", "hydrocarbon-based substituent" and the like denotes the substituent having a carbon atom directly attached to the remainder of the molecule (i.e., the carboxylic acylating portion) and having predominantly hydrocarbyl character within the context of this invention. Such substituents include the following:

(1) hydrocarbon substituents, that is, aliphatic (e.g., alkyl or alkenyl), alicyclic (e.g., cycloalkyl, cycloalkenyl) substituents, aromatic, aliphatic and alicyclic-substituted aromatic nuclei and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon radicals which, in the context of this invention, do not alter the predominantly hydrocarbyl substituent; those skilled in the art will be aware of such radicals (e.g., halo (especially chloro and fluoro), alkoxyl, mercapto, alkylmercapto, nitro, nitroso, sulfoxy, etc.);

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbyl.

In general, the hydrocarbon-based substituents of at least about 20 carbon atoms present in the acylating agents used in this invention are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation.

As noted above, the hydrocarbon-based substituents present in the acylating agents of this invention are derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group $>C=CH_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon-based substituents in the acylating agents used in this invention are ethylene, propylene, butene-1, butene-2, isobutene, pentene-1, hexene-1, heptene-1, octene-1, nonene-1, decene-1 pentene-2, propylene tetramer, diisobutylene, isobutylene trimer, butadiene-1,2, butadiene-1,3, pentadiene-1,2, pentadiene-1,3, isoprene, hexadiene-1,5, 2-chlorobutadiene-1,3, 2-methylheptene-1, 3-cyclohexylbutene-1, 3,3-dimethylpentene-1, styrenedivinylbenzene, vinylacetate allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s such as obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These poly(isobutene)s contain predominantly (that is, greater than 80% of the total repeat units) isobutene repeat units of the configuration

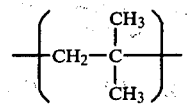

Typically, the hydrocarbyl-based substituent in the carboxylic acid acylating agent as used in the present invention is an alkyl or alkenyl group of about 30, often about 50, to about 500, sometimes to about 300, carbon atoms. For convenience herein, such substituents are represented by the indicia "hyd".

As noted above, typical acylating agents (A) used in making the derivatives of this invention are substituted succinic acids or derivatives thereof. In this case, the acylating agent (A) can be represented by the formulae:

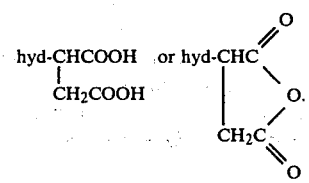

Such succinic acid acylating agents can be made by the reaction of maleic anhydride, maleic acid, or fumaric acid with the afore-described olefin polymer, as is shown in the patents referred to above. Generally, the reaction involves merely heating the two reactants at a temperature of about 150° to about 200°. Mixtures of these polymeric olefins, as well as mixtures of these unsaturated mono- and polycarboxylic acids can also be used.

The alkanol tertiary monoamines, (B)

The amines used in making the derivatives of the present invention are tertiary monoamines having one hydroxyl group per molecule and normally up to about 40 carbon atoms. These hydroxyl groups are bonded to an alkyl group which in turn is bonded to the amine portion of the molecule. The two remaining substituents bonded to the tertiary amine nitrogen are hydrocarbyl groups each having one to about 20 carbon atoms. Usually they will also be alkyl groups, but they can be alkenyl groups with one olefinic bond. Typically they are lower alkyl groups of up to seven carbons, though they can also be aryl, aralkyl, alkaryl, cycloalkyl, alkyl cycloalkyl, and cycloalkylalkyl groups. Mixtures of two or more of the amines (B) can also be used.

A typical class of useful amines can be represented by the formula

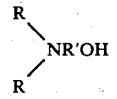

wherein each R is independently a hydrocarbyl group of one to about eighteen carbon atoms and R' is a straight or branched chain alkylene group of about two to about eighteen carbon atoms. The N/N-dialkyl-alkanol amines within the above formula are particularly preferred, especially those wherein each R is independently a lower alkyl and R' is lower alkylene. The two R groups can be joined by a carbon-to-carbon bond or a heteroatom (e.g., —O— or —S—) to form a 5- or 6-membered heterocyclic ring.

Specific examples of useful alkanol amines (B) include N,N-diethyl ethanol amine, N-methyl, N-phenyl-2-hydroxy propyl amines, N,N-dimethyl-2-hydroxybutyl amine, N,N-diethyl-2-hydroxy octadecyl amine, N-(2-hydroxy ethyl)morpholine, N-methyl(2-hydroxy ethyl)cyclohexylamine.

The reaction of the acylating agent (A) with the alkanol amine (B) to form the nitrogen-containing derivative The reaction of the acylating agent with the alkanol amine can be carried out at a temperature ranging from about 30° to the decomposition temperature of one or more of the reaction components and/or products. Typically, it is carried out at a temperature in the range of about 50° to about 150°. Often the reaction is carried out under ester-forming conditions and the product thus formed is an ester or an ester/salt. This salt can be an internal salt involving residues of a molecule of acylating agent and of amine, wherein one of the carboxyl groups becomes ionically bound to a nitrogen atom within the same group or it may be an external salt wherein the ionic salt group is formed with a nitrogen atom which is not part of the same molecule.

Mixtures of acylating agents and/or mixtures of alkanol amines can be used. Generally, the equivalent ratio of acylating agent to alkanol amine formed is in the range of about 0.5 to about 3 equivalents of amine per equivalent of carboxylic acylating agent. An equivalent of carboxylic acylating agent can be determined by dividing the molecular weight of the acylating agent by the number of carboxyl functions. This can usually be determined from the structural formula of the acylating agent or empirically through well-known titration procedures. Thus a succinic anhydride has an equivalent weight of half its molecular weight. An equivalent of alkanol amine is equal to its molecular weight. Typically, equivalent ratios of acylating agent (A) to amine (B) is in the range of about 1:1 to about 1:2.5.

Usually the agent (A) and amine (B) are reacted at a temperature below about 100° C., often in the absence of additional solvent/diluents.

Supplemental reagents

While the afore-described acylating agent (A) and amines (B) are the only necessary acylating agent and amines present in the reaction producing the derivatives of this invention, it is sometimes the case that supplemental carboxylic acylating agents (C) and/or alkanol amines (D) are present. It is, of course, essential that the (A) agents and (B) amines be present in significant amounts; this means at least 50(mole)% of the total acylating agent (i.e., (A) plus (C)) and at least 50(mole)% of the total amine (i.e., (B) plus (D)) are the essential acylating agent (A) and amine (B), respectively.

Typical supplemental acylating agents (C) include fatty acids of 10 to 18 carbon atoms such as oleic, stearic, linoleic acids and the well-known commercial fatty acid mixtures such as coco acids, tallow acids, tall oil acids, and the like. Low molecular weight alkyl and alkenyl succinic acid acylating agents such as tetrapropenyl succinic anhydride can also be included in the supplemental acylating agent class.

Typical supplemental alkanol amines (D) can contain up to about 26 carbon atoms and include primary, secondary and tertiary alkanol amines (e.g., ethanol amine, di-(2-propanol)amine, N,N-di(2-hydroxy ethyl)ethyl amine, 2-, 3-, and 4-hydroxy butanol amines and their monomethyl homolog, N(2-hydroxyethyl)aniline and triethanol amine. The supplemental alkanol amines (D) usually will be one or more amines of the formula

$R_1R_2N—R_3—OH$ wherein $R_1$ and $R_2$ are each independently selected from the group consisting of hydrogen, alkyl, alkenyl, hydroxy alkyl and hydroxy alkenyl, and $R_3$ is straight or branched chain alkylene. Usually $R_1$ and $R_2$ will each independently be hydrogen or lower alkyl and $R_3$ will be lower alkylene. Ethanol amine is especially preferred. Of course, when one or more supplemental alkanol amines (D) are present, they will be different than the alkanol tertiary monoamines (A). In other words, it is a proviso that (D) is exclusive of (A).

As noted above, the supplemental acylating agents (C) and/or amines (D) can, respectively, constitute no more than up to about 50(mole)% of the total acylating agent or amine present in the reaction mixture. Sometimes they are not present at all and the acylating agent (A) and alkanol amine (B) are the only acylating agent and amine present.

The following are specific examples of the preparation of nitrogen-containing, phosphorus-free carboxylic acid derivatives of the present invention. In these examples all parts and percentages are by weight unless expressly stated to the contrary and all temperatures are in degrees Celsius, as is the case throughout the specification and appended claims.

EXAMPLE 1

To a charge of 2240 parts of a poly(isobutene)-substituted succinic anhydride (having a molecular weight of 1120) heated in a resin kettle with stirring to about 90° is slowly added over a two-hour period 468 parts of diethyl ethanol amine. Heating is continued for an additional hour at about 90°. The desired reaction product is a viscous, clear, brown-tinted liquid at room temperature.

EXAMPLE 2

To a charge of 6720 parts of the succinic anhydride described in Example 1, heated to 90° with stirring, is slowly added over 1.5 hours, 702 parts of diethyl ethanol amine. This intermediate mixture is then heated for an additional 0.5 hour at 90°. Then 366 parts of monoethanol amine is slowly added. The mixture is then held at 90° for a final 0.5 hour and cooled to provide a clear brown, viscous liquid product.

Use of the carboxylic acid derivatives

The carboxylic acid derivatives of this invention can be used to solubilize normally water-insoluble, oil-soluble functional additives in water-based systems, particularly in systems containing less than 15% hydrocarbyl oil. When so used, they are often used in conjunction with a non-ionic hydrophilic surfactant or wetting agent such as Triton X-100, an ethoxylated alkyl-substituted phenol having a molecular weight of approximately 628 and containing an average of 9–10 ethyleneoxide derived units. This material is available commercially from the Rohm & Haas Company. Other similarly useful surfactants will occur to those of skill in the art.

When used in conjunction with such a surfactant, the carboxylic acid derivatives of this invention are combined with the surfactant and an oil-soluble, water-insoluble functional additive. Typical functional additives include the well-known phosphorus and/or sulfur-containing anti-wear, extreme pressure (E.P.) and load-carrying agents used typically in mineral oil-based lubricant and functional fluid formulations. Exemplary of such materials are those found in the two books entitled "Lubricant Additives" referred to above under "Description of the Prior Art". Specific examples include the Group II metal salts of acid phosphate and thio (including dithio), phosphate hydrocarbyl esters; particularly the zinc esters.

The combination of carboxylic acid derivative, surfactant and functional additive can be done in the absence of any solvent/diluent. Usually, however, it is preferable to include a solvent/diluent and an ideal one is water. Such combinations form aqueous concentrates. Such aqueous concentrates are used merely for convenience and it is possible to make effective concentrates without water. Typical water-free concentrates contain 40–70% carboxylic acid derivative, 5–20% surfactant and 10–40% functional additive. Water, when present in such concentrates constitutes 40–70% of the concentrate and the proportion of other materials is reduced proportionately. In other words, the relative proportions of carboxylic acid derivative, surfactant and additive, however, remain within the ranges given above for the water-free concentrate.

EXAMPLE A

A mixture is prepared of 40 parts of the carboxylic acid derivative of Example 1, 10 parts Triton X-100 and 16.67 parts of a commercial anti-wear, load-carrying additive, which is the zinc salt of an acid 0,0'-di(alkyl-substituted phenyl) dithiophosphate. The mixture is stirred well to insure thorough mixing and transferred to a closed container for storage. This system is useful as a water-dilutable hydraulic fluid concentrate, especially when diluted in the proportions 95 parts water to 5 parts concentrate.

Up to 15% hydrocarbyl oil, such as mineral oil, may also be used in certain concentrates containing the carboxylic acid derivatives of this invention. Here the oil is used to reduce viscosity and thus facilitate handling, though it may serve other purposes as well. An example of such a concentrate is the following:

EXAMPLE B

A mixture is formed of 30 parts naphthenic solvent neutral oil having a viscosity of 100 SSU, 40 parts of the carboxylic acid of Example 1 and 30 parts of Minform 2X, a commercially available surfactant comprising a modified linear alcohol ethoxylate available commercially from the Union Carbide Corporation. This concentrate was mixed with about 30 parts water and observed visually. The mixture appeared to be clear and not show any of the opaque characteristics of a typical emulsion.

Ten parts of the concentrate of Example B is combined with one part of a commercial water-insoluble, oil-soluble, high molecular weight ester dispersant. The resulting mixture is then diluted to approximately 30% in water. Again, visual inspection shows no evidence of gross emulsion formation, i.e., no opaque appearance, phase separation or the like. Such systems find utility in hydraulic fluids or cutting fluid (i.e., metal-forming) formulations.

Finally, it should be noted that while the carboxylic acid derivatives (A) of this invention have been described as useful as solubilizing agents for water-insoluble functional additives, it has also been observed that they can provide lubricity and anti-friction properties to aqueous lubricating fluids containing them.

What is claimed is:

1. A nitrogen-containing, phosphorus-free carboxylic acid derivative made by reaction of a mixture consisting essentially of:
   (A) at least one carboxylic acid acylating agent having at least one hydrocarbyl-based substituent of about 50 to about 500 carbon atoms;
   (B) at least one alkanol tertiary monoamine having the formula

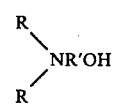

wherein each R is a lower alkyl group and R' is an alkylene group of two to about eighteen carbon atoms; and
   (D) at least one other alkanol amine having the formula $R_1R_2N\text{-}R_3\text{-}OH$, wherein $R_1$ and $R_2$ are each hydrogen, alkyl, alkenyl, hydroxy alkyl or hydroxy alkenyl and $R_3$ is alkylene;
      the amount of said other alkanol amine (D) being no more than about 50 mole percent of the amount of (B) and (D) combined; and
      the equivalent ratio of acylating agent (A) to the amount of (B) and (D) combined is in the range of about 1:0.5 to about 1:3.0.

2. A derivative as claimed in claim 1 wherein said acylating agent (A) can be represented by the formula

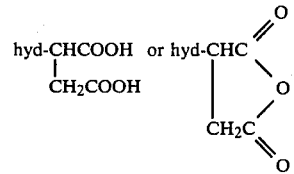

wherein hyd is an alkyl or alkenyl group of about 50 to about 500 carbon atoms.

3. A derivative as claimed in claim 2 wherein said monoamine (B) is diethyl ethanol amine and said derivative is an ester/salt.

4. A derivative as claimed in claim 2 wherein hyd is a poly(isobutene) group of about 50 to about 300 carbon atoms.

5. A derivative as claimed in claim 3 wherein hyd is a poly(isobutene) group of about 50 to about 300 carbon atoms.

6. A derivative as claimed in claim 1 wherein the equivalent ratio of acylating agent (A) to the amount of (B) and (D) combined is in the range of about 1:1 to about 1:2.5.

7. A water-based system useful as a lubricant or functional fluid comprising about 40 to about 70% of water, from 0 up to about 15% hydrocarbyl oil and a mixture comprising (a) from about 10 to about 40% of at least one normally water-insoluble, oil soluble functional additive selected from the group consisting of phosphorus and/or sulfur-containing anti-wear, extreme pressure, or load carrying agents, and (b) from about 40 to about 70% of a nitrogen-containing, phosphorus-free carboxylic acid derivative made by reaction of a mixture consisting essentially of (A) at least one carboxylic acid acylating agent and (B) at least one alkanol tertiary monoamine, said acylating agent (A) having at least one hydrocarbyl-based substituent of about 50 to about 500 carbon atoms and said monoamine (B) being represented by the formula

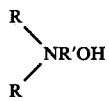

wherein each R is a lower alkyl group and R' is an alkylene group of two to about eighteen carbon atoms, the equivalent ratio of acylating agent (A) to monoamine (B) used in the reaction being in the range of about 1:0.5 to about 1:3.0.

8. A water-based system useful as a lubricant or functional fluid comprising about 40 to about 70% of water, from 0 up to about 15% hydrocarbyl oil and a mixture comprising (a) from about 10 to about 40% of at least one normally water-insoluble, oil soluble functional additive selected from the group consisting of phosphorus and/or sulfur-containing anti-wear, extreme pressure, or load carrying agents, and (b) from about 40 to about 70% of a nitrogen-containing, phosphorus-free carboxylic acid derivative made by reaction of a mixture consisting essentially of (A) at least one carboxylic acid acylating agent and (B) at least one alkanol tertiary monoamine, said acylating agent (A) being represented by the formula

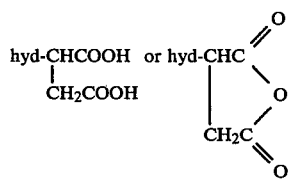

wherein hyd is an alkyl or alkenyl group of about 50 to about 500 carbon atoms and said monoamine (B) being represented by the formula

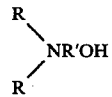

wherein each R is a lower alkyl group and R' is an alkylene group of two to about eighteen carbon atoms, the equivalent ratio of acylating agent (A) to monoamine (B) used in the reaction being in the range of about 1:0.5 to about 1:3.0.

9. A water-based system useful as a lubricant or functional fluid comprising about 40 to about 70% of water, from 0 up to about 15% hydrocarbyl oil and a mixture comprising (a) from about 10 to about 40% of at least one normally water-insoluble, oil soluble functional additive selected from the group consisting of phosphorus and/or sulfur-containing anti-wear, extreme pressure, or load carrying agents, and (b) from about 40 to about 70% of a nitrogen-containing, phosphorus-free carboxylic acid derivative as claimed in claim 1.

10. The water-based system of any one of claims 7–9 wherein the mixture also contains (c) from about 5 to 20% of a surfactant.

11. A system as claimed in claim 8 wherein said monoamine (B) is diethylethanolamine and said derivative is an ester/salt.

12. A system as claimed in claim 8 wherein hyd is a poly(isobutene) group of about 50 to about 300 carbon atoms.

13. A system as claimed in claim 7 wherein the equivalent ratio of acylating agent (A) to monoamine (B) in the reaction is in the range of about 1:1 to about 1:2.5.

14. A nitrogen-containing, phosphorus-free carboxylic acid derivative made by reaction of a mixture consisting essentially of (a) at least one carboxylic acid acylating agent represented by the formula

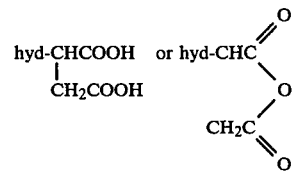

wherein hyd is an alkyl or alkenyl group of about 50 to about 200 carbon atoms and (B) a mixture of monoethanolamine and diethylethanolamine, the equivalent ratio of (A) to (B) used in the reaction being in the range of about 1:0.5 to about 1:3.0.

15. A water-based system useful as a lubricant or functional fluid comprising about 40% to about 70% of water, from 0 up to about 15% hydrocarbyl oil and a mixture comprising (a) from about 10% to about 40% of at least one normally water-insoluble, oil-soluble functional additive selected from the group consisting of phosphorus and/or sulfur-containing anti-wear, extreme pressure or load-carrying agents, and (b) from about 40% to about 70% of a nitrogen-containing, phosphorus-free carboxylic acid derivative as claimed in claim 14.

16. The water-based system of claim 15 wherein the mixture also contains (c) from about 5% to about 20% of a surfactant.

* * * * *